Patented July 4, 1933

1,916,478

UNITED STATES PATENT OFFICE

WALTER HOHLWEG, OF VIENNA, AUSTRIA

PROCESS OF OBTAINING EFFICIENT GERM-GLAND SUBSTANCES IN A WATER-SOLUBLE CONDITION

No Drawing. Application filed August 25, 1927, Serial No. 215,530, and in Germany September 4, 1926.

I have filed an application in Germany on September 4th, 1926.

This invention relates to the preparation of efficient germ-gland constituents and more especially of water soluble germ-gland preparations.

By extracting the germ-glands, comprising the male and female sex organs as for instance the testicles and prostatæ, the ovariæ and placentæ, in usual manner, saponifying the extract and separating and cleaning the non-saponifiable part, only oleous substances are obtained, which dissolve readily in most organic solvents, are resistive against alkalis and acids and against boiling and are capable of doing away in a large degree, with the deficiencies caused by castration with animals and of bringing about the growth of the uterus and of the mammery gland when applied to female animals and evoking of the oestric cyclus. However, these non-saponifiable oleous preparations are not soluble in water and can therefore not well be administered for clinical purpose by intramuscular or subcutaneous injection.

It has been found that aqueous solutions of the efficient germ-gland substances suitable for intramuscular or subcutaneous injection are obtained, when the above-mentioned non-saponifiable oleous substances are treated with alkaline earths in aqueous solution. From the filtrates gained thereby the alkaline earths are precipitated for example by means of introducing carbonic acid and the alkali earth carbonates thus formed are removed by filtration. The remaining aqueous solution contains the germ-gland substances (hormones). The aqueous solution thus obtained can be administered by subcutaneous or intramuscular injection.

First example

A raw acetone extract from dried placenta is saponified by boiling with potassium hydroxide in alcohol solution. The alcohol is removed by distillation and the soap thus obtained dissolved in 2000 parts of water. This solution is extracted with ether, the ether is removed by distillation and the residue dissolved in boiling methyl alcohol. After cooling the cholesterine, which has separated out, is removed by filtration. The solution is subjected to distillation; the residue is an oleous substance which contains the hormon. 3 parts in weight of this hormon-oil are dissolved in 100 parts in volume of alcohol, and during a good agitation 500 parts in volume of a hot concentrated baryta-lye are slowly poured into the solution. The composition is heated to the boiling temperature and boiled for some time while the agitation is continued. Next the liquid is filtered off. Carbonic acid is passed into the hot liquid and the formed barium-carbonate is filtered off. The admission of carbonic acid is repeated until turbidity does not take place any more. The remaining clear aqueous hormon-solution is reduced to the desired concentration.

Second example 3 parts in weight of purified hormon-oil according to Example 1 are dissolved in 30 parts in volume of alcohol and are mixed up with powdery hydrate of calcium until a thick paste is formed, which hereafter is boiled for some time in 500 parts in volume of water while agitating the mixture. The liquid is filtered off from the undissolved parts, precipitation by carbonic acid is carried out and the calcium carbonate is filtered. The result is the clear aqueous hormon-solution.

Third example 10 grammes of raw ether extract from dry placenta are mixed to a homogeneous substance with 15 grammes of fine powdery hydrate of calcium and the substance thus formed is boiled for some time with 200 cubic centimetres of water while agitating. After filtration, carbonic acid is passed into the hot liquid and the precipitated calcium carbonate is sucked away. The clear aqueous filtrate contains the hormon.

The process is carried out in a similar manner as described with respect to the above example in the case of strontium hydroxide. When in the claims terms such as "hormone", "hormone-oil" "and efficient constituents of germ glands" are used, they refer to the substances clearly described in paragraphs 1, 2 and 4, page 1 of the specification.

The aqueous hormon-solution produced in the manners above described are free of any salts.

I claim—

1. Process of obtaining aqueous solutions of efficient constituents of germ glands consisting in dissolving a non-saponifiable sexual-hormone oil in alcohol, mixing to the solution a powdery hydrate of an alkaline earth until a thick paste is formed, boiling after addition of water while agitating the mixture, filtering off the liquid, precipitating in the latter the alkaline earth by carbonic acid and separating the formed carbonate from the aqueous hormone solution.

2. Process of obtaining aqueous solutions of efficient constituents of germ glands consisting in mixing a non-saponifiable hormone oil with a powdery hydrate of an alkaline earth, boiling the mixture after addition of water while agitating it, filtering off the liquid, precipitating the alkaline earth in the latter by carbonic acid and separating the formed carbonate from the aqueous hormone solution.

3. Process of obtaining aqueous solutions of efficient constituents of germ glands consisting in treating non-saponifiable oily sexual-hormone preparations with an alkaline earth in the presence of water and separating the alkaline earths by means of a precipitating agent.

4. Process of obtaining aqueous solutions of efficient constituents of germ glands consisting in treating non-saponifiable oily sexual-hormone preparations with an alkaline earth in the presence of water and separating the alkaline earths as carbonates by introducing carbonic acid and filtering the deposit.

5. Process of obtaining aqueous solutions of efficient constituents of germ glands consisting in dissolving non-saponifiable oily sexual-hormone preparations in alcohol, adding to the solution a hot concentrated solution of barium hydrate in water while agitating the mixture, boiling the said mixture for some time during continued agitation, filtering off the liquid, passing carbonic acid into the hot liquid, filtering off the formed barium-carbonate, repeating the supply of carbonic acid until turbidity does not take place any more, and reducing the remainder clear aqueous hormone solution to the desired concentration.

6. Process of obtaining aqueous solutions of efficient constituents of germ glands consisting in dissolving non-saponifiable oily sexual-hormone preparations in alcohol, adding to the solution a hot solution of an alkaline earth in water while agitating the mixture, boiling the said mixture while continuing with agitation, filtering off the liquid, precipitating the alkaline earth by carbonic acid and separating the formed carbonate from the aqueous hormone solution.

In testimony whereof I affix my signature.

WALTER HOHLWEG.